Oct. 20, 1970     C. F. COLE, JR., ET AL     3,535,634

SENSOR CONTROL DEVICE

Filed July 19, 1968     2 Sheets-Sheet 1

INVENTORS.
CHARLES F. COLE JR. &
DORRIS F. RICHESIN
BY
William J. Miller
ATTORNEY

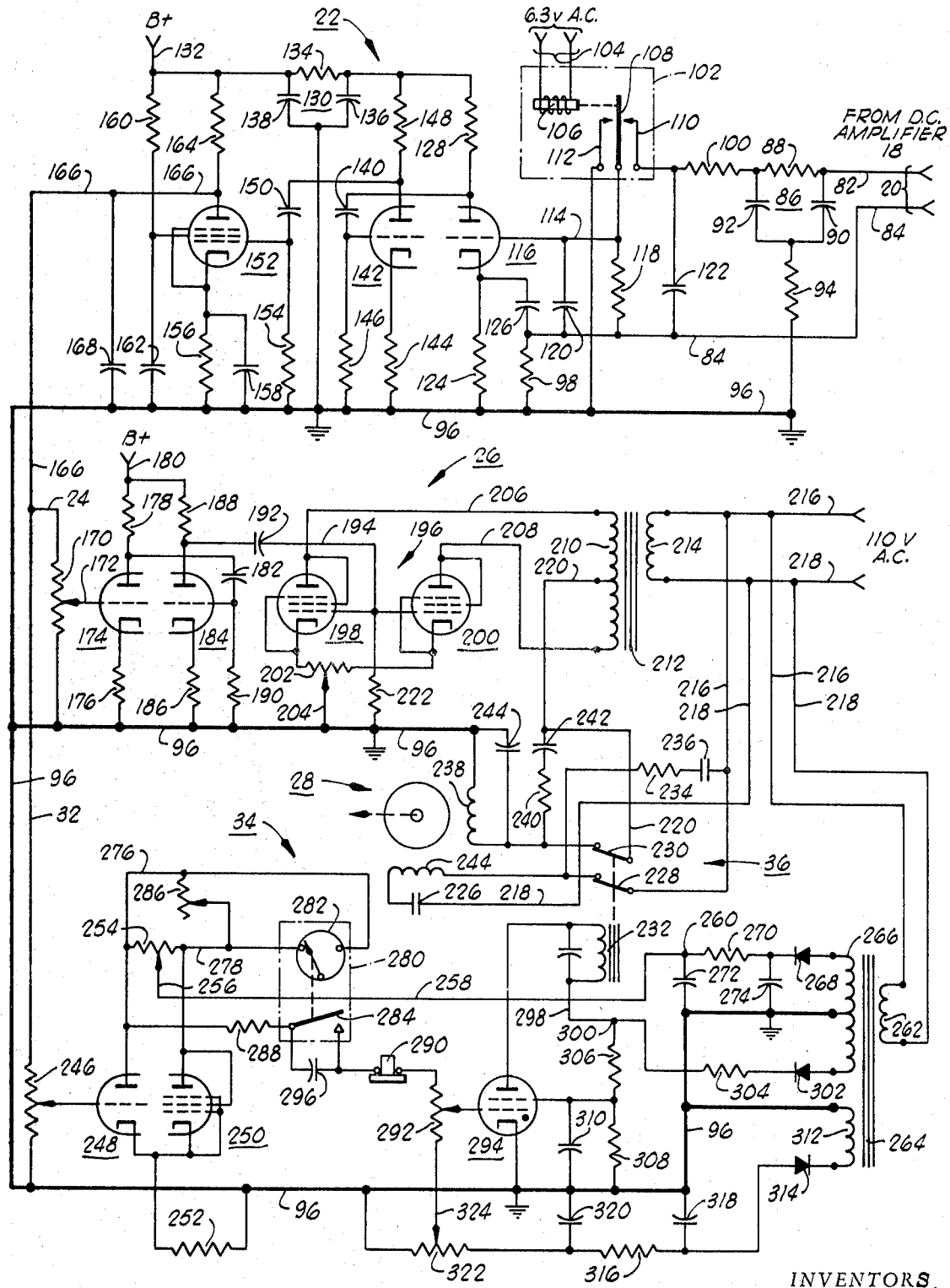

United States Patent Office 3,535,634
Patented Oct. 20, 1970

3,535,634
SENSOR CONTROL DEVICE
Charles F. Cole, Jr., and Dorris F. Richesin, Ponca City,
Okla., assignors to Continental Oil Company, Ponca
City, Okla., a corporation of Delaware
Filed July 19, 1968, Ser. No. 746,181
Int. Cl. G01r 19/16, 17/06; G01n 31/08
U.S. Cl. 324—103
11 Claims

ABSTRACT OF THE DISCLOSURE

Apparatus for maintaining a reference detection level in certain forms of testing equipment and, particularly, for maintaining base line potential in gas chromatograph detection; the device consisting of analog circuitry capable of continually monitoring a reference value for input to servo control circuitry which responds to reference deviation to control a potential source such that it tends to maintain the reference value; the device further including servo disabling circuitry for momentarily stopping servo control circuit operation during presence of a peak or valid detected value.

BACKGROUND OF THE INVENTION

Field of the invention

The invention relates generally to sensor control devices and, more particularly, but not by way of limitation, it relates to improvements in apparatus for detecting sensed gas chromatograph indications.

Description of the prior art

The prior art includes various forms of device which serve to correct or minimize chromatograph base line indications, the prior forms of device being generally directed to the different modes of digital processing of such electrical indications. These devices require some form of analog-to-digital conversion whereupon the chromatograph sensor indications are digitally processed to derive the final, integrated data considerations indicating types and amounts of gaseous material in a given composition. While such digital processing systems perform to yield the desired chromatographic result, such systems are necessarily complex and require large economic outlay such that expense can become a limiting factor in utilization of the chromatographic principles.

SUMMARY OF THE INVENTION

The present invention contemplates an apparatus for use with sensing equipment to maintain a sensed output at a constant reference value while intermittently allowing valid indication values. In a more limited aspect, the invention utilizes analog control equipment to monitor output indications of a gas chromatograph; more specifically, gas chromatograph readings taken from a thermal conductivity bridge or such are utilized with a servo control system for maintaining the base line reference value constant and continually corrected as to drift, and the sensed output is also applied through peak detector means which functions to disable the servo control system when valid sensor output of greater than predetermined amplitude is detected.

Therefore, it is an object of the present invention to provide a relatively simple, analog device for base line drift correction of a gas chromatograph device.

It is a further object of the present invention to provide apparatus whereby computation of area under a chromatograph peak can be made more easily and more reliably since the maintaining of a constant base line allows the employ of various forms of mechanical integrator with reasonable accuracy.

It is also an object of the present invention to provide a sensor controller which is simple to operate and more economical than the existing types of equipment which provide generally similar function.

Finally, it is an object of the present invention to provide an analog controller for gas chromatograph base-line drift correction which may be operated independently from a recording equipment functioning with the chromatograph instrument.

Other objects and advantages of the invention will be evident from the following detailed description when read in conjunction with the accompanying drawings which illustrate the invention.

BRIEF DESCRIPTION OF THE DRAWINGS

FIG. 3 is a schematic diagram of the servo amplifier peak detector, and motor control circuits of the FIG. 1 circuitry.

DESCRIPTION OF THE INVENTION

Figure 1:
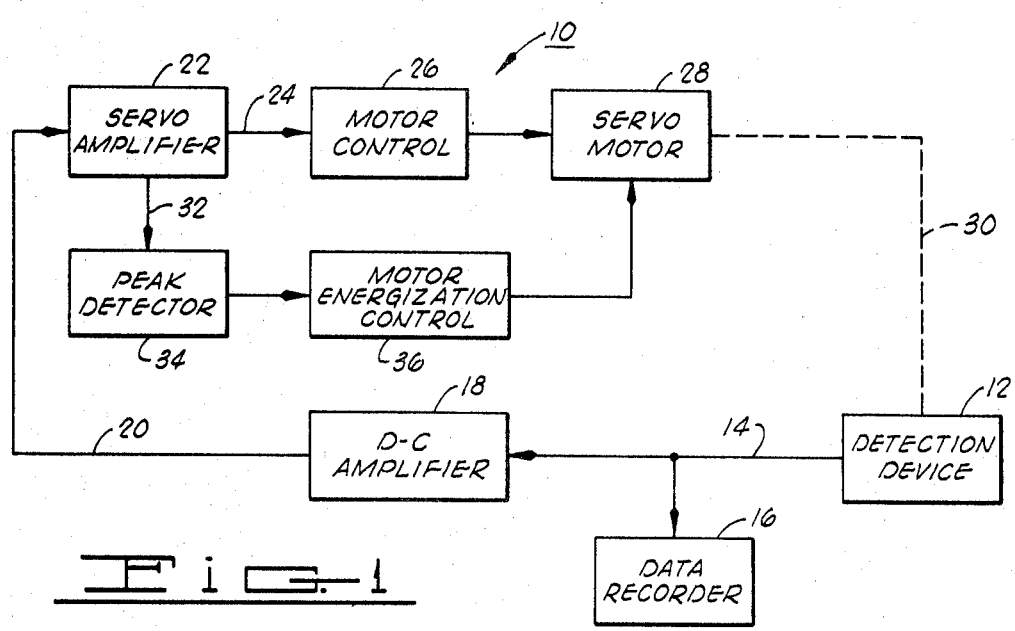
FIG. 1 is a block diagram of the analog sensor control device which constitutes the invention.

As shown in FIG. 1, a sensor control device 10 consists of a selected form of detection device 12 which may be utilized with a particular testing procedure. In the present case, detection device 12 is utilized with a gas chromatograph and it provides an output signal on lead 14 which has a base line or reference value and, intermittently, peak values of varying amplitude and duration. The peak values will vary in accordance with the amount and type of a particular gas flowing within the chromatograph columns or such. The output signal on lead 14 may be applied directly to a data recorder 16 whereupon a final record is compiled for storage, integration, or whatever. The signal on lead 14 is also applied to a D-C amplifier 18 which amplifies and prepares the signal for feedback via lead 20. The D-C amplifier 18 may be a standard form of D-C amplifier, e.g. a Hewlett-Packard model 412A or model 413A, either having an approximate gain of one thousand.

The amplified control signal on lead 20 is applied to a servo amplifier 22 which operates to generate a motor control signal on a lead 24 which, in turn, energizes a motor control circuit 26 such that servo motor 28 is rotated through a desired control movement. Thus, rotational output via linkage 30 is employed to adjust detection device 12 through a correctional movement to maintain a desired output via lead 14, as will be further described below. The servo amplifier 22 also provides an output on a lead 32 to a peak detector 34. The peak detector 34 controls motor energization control 36 such that servo motor 28 is disabled during presence of a peak or valid gas detection indication as originating in detection device 12.

Figure 2:
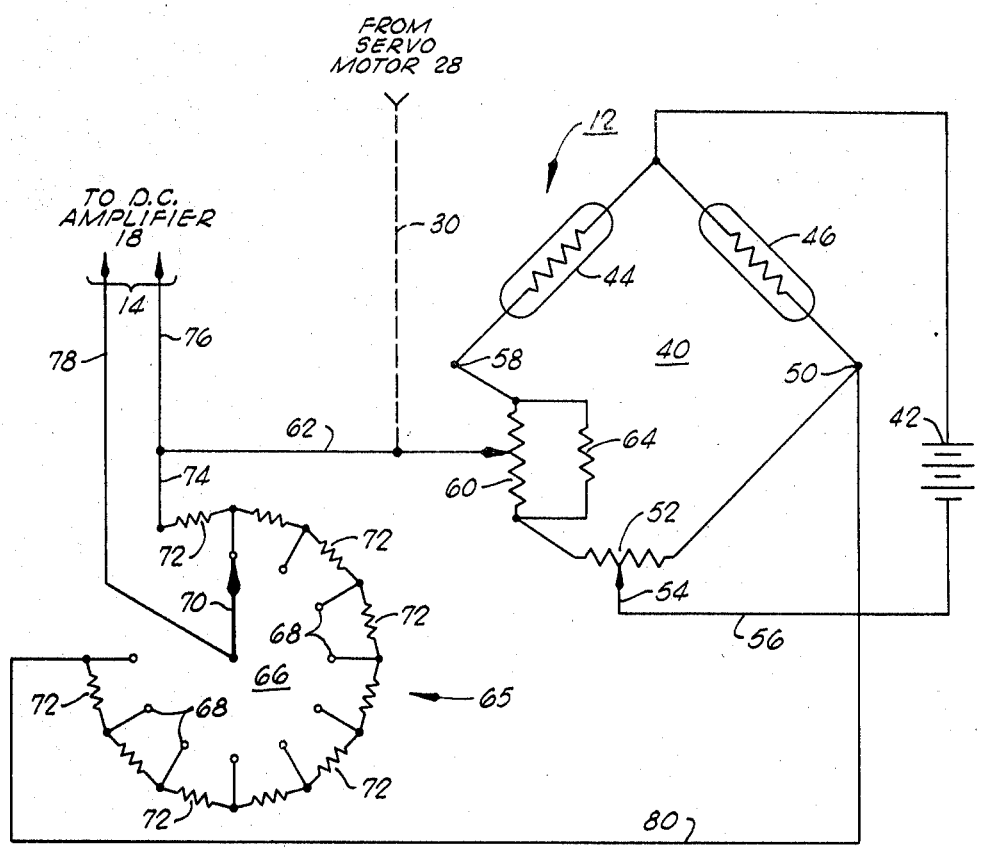
FIG. 2 is one form of sensor or detection device which may be employed with the invention as outlined in FIG. 1.

While various forms of detection device 12 may be employed in both chromatographic apparatus and other forms of sensing of physical properties, the thermal conductivity sensor of FIG. 2 is a preferred form of chromatograph detector. Thus, detection device 12 may consist of a detector bridge 40 energized by a suitable D-C voltage source 42 and consisting of a pair of thermistors 44 and 46 connected in parallel across the voltage source 42. The thermistor 46 may be connected through a terminal 50 to a balance adjustment potentiometer 52 with return through wiper 54 and lead 56 to voltage source 42. The other thermistor 44 is connected through a terminal 58 and a control potentiometer 60 to the balance adjusting potentiometer 52 for similar return to voltage source 42. The control potentiometer 60 is preferably a helical potentiometer, e.g. a 50 ohm potentiometer through ten revolutions, and its rotary wiper 62 is connected to receive rotational motion via linkage 30 from servo motor 28. A very small resistor 64, e.g. a one ohm resistor, is connected in parallel across control potentiometer 60 to adjust the variable resistance down to a low resistance value which is in keeping with the values attendant such thermal conductivity bridges.

An attenuator 65 serves to allow selection of a desired magnitude of output on output leads 14 to the D-C amplifier 18 as well as to data recorders, integrators, or other equipment. The attenuator 65 consists of a selector switch 66 having a plurality of terminals 68 which are arranged to be successively contacted by a wiper element 70. A plurality of resistors 72 of graduated value, in accordance with desired attenuation characteristics, are connected in series and between each successive ones of selector switch contacts 68. The output from thermal conductivity bridge 40 via wiper 62 is applied on a lead 74 to attenuator 65 as well as via a lead 76 which constitutes one lead of connection 14 (FIG. 1). The wiper 70 of attenuator 65 is connected to a lead 78, the other lead of connection 14, and the opposite end of attenuator 64 is connected via a lead 80 for return back to terminal 50 of the thermal conductivity bridge 40. Thus, attenuator 65 can be adjusted to select any desired magnitude of the signal output from control potentiometer 60 for amplification via connection 14, leads 76 and 78.

Referring now to FIG. 3, the circuitry of servo amplifier 22, motor control 26 and peak detector 34 are shown in detailed isolation. The servo amplifier 22 receives input via leads 20 from D-C amplifier 18 (FIG. 1). Thus, input line 20 consists of a pair of leads 82 and 84 which are applied to a suitable low pass filter 86. The low pass filter 86 consists of a series resistance 88 and a pair of parallel capacitors 90 and 92 which are connected through a resistor 94 to a ground buss 96. The capacitors 90 and 92 may be on the order of .1 microfarad, thus bringing the passband of filter 86 to about twelve cycles per second and lower. It may be noted that the low side input lead 84 of line 20 is maintained slightly above ground by connection through a suitable resistor 98, on the order of 150 ohms, as connected to the ground buss 96.

The output signal from filter 86 is then applied through a series resistor 100 for input to a standard form of voltage chopper 102. Voltage chopper 102 may be one of many commercially available types which operate on a 6.3 volt A-C input at leads 104 to energize a coil 106 to vibrate contact 108. The contact 108 then makes alternating contact with signal input contact 110 and ground contact 112 to provide a pulsating D-C (effectively an A-C voltage) input on lead 114 to the grid of a triode 116. A resistor 118 and capacitor 120 are connected between lead 114 and lead 84 to provide an effective grid leak biasing. Also, a capacitor 122 is connected between input contact 110 and low side lead 84.

The triode 116 is connected as an amplifier having its cathode biased by a resistor 124 connected to ground buss 96, a capacitor 126 providing necessary by-pass, and having the plate connected through a load resistor 128 and a decoupling network 130 to a source 132 of B+ energizing voltage. The decoupling network 130 consists of a series resistance 134 and a pair of parallel-connected capacitors 136 and 138 of relatively large value connected to ground. The output from triode 116 is taken from its plate through a coupling capacitor 140 for input to the grid of a triode 142. Triode 142 has the cathode connected through a resistor 144 to ground and a resistor 146 provides grid biasing. The plate of triode 142 is then connected through a load resistor 148 and decoupling network 130 to the B+ source 132. The output from triode 142 is taken from its plate for application through a coupling capacitor 150 for input to the grid of a pentode 152.

The grid of pentode 152 is biased by means of a resistor 154 to ground and the cathode is biased through a resistor 156 and a parallel by-pass capacitor 158. The screen grid of pentode 152 receives potential through a voltage dropping resistor 160 connected to B+ source 132 and a decoupling capacitor 162 is connected to ground. The plate is energized through a load resistor 164 to B+ source 132, and the amplified voltage output is present on a lead 166 for application both on lead 24 to motor control 26 and on lead 32 to peak detector 34. A capacitor 168 of relatively high value provides filtering of low frequency interference from the sixty cycle alternating voltage present on lead 166.

Input on lead 24 is applied across a potentiometer 170 which provides a gain adjustment for input signal present on wiper lead 172 connected to the grid of a triode 174. Triode 174 is connected as a conventional amplifier with its cathode connected through a resistor 176 to ground and its plate connected through a load resistor 178 to a B+ voltage source 180. An output from triode 174 is taken from the plate through a coupling capacitor 182 for input to the grid of a next successive stage of amplification, amplifier 184. Here again, the cathode is connected through a cathode resistor 186 while the plate is connected through load resistor 188 to B+ source 180. Grid biasing is provided by means of a resistor 190. The output from triode 184 is also taken off from its plate through a coupling capacitor 192 whereupon it is available on lead 194 for application to a phase detector 196.

The phase detector 196 consists of a pair of pentodes 198 and 200 having their cathodes connected through a balancing potentiometer 202 and wiper lead 204 to ground, and having their plates connected via respective leads 206 and 208 to opposite sides of a secondary transformer winding 210 of transformer 212. The transformer 212 receives 110 volt A-C energization at its primary 214 by means of input on leads 216 and 218. The secondary winding 210 includes a center tap connection 220 which leads to the motor energization control 36, to be further described below. The input lead 194 to phase detector 196 is applied in parallel to the grids of respective pentodes 198 and 200 as a resistor 222 supplies bias connection to ground.

The servo motor 28 is a two-phase A-C motor of the type which includes an energizing winding 224 which is connected through a capacitor 226 to one side of the A-C line 218 and through a relay contact 228 to the other side of the A-C line 216. Relay contact 228 as well as a second relay contact 230 are operable upon energization of relay coil 232, this relay assembly comprising the motor energization control 36. A by-pass resistor 234 and series capacitor 236 are connected across relay contact 228 to provide arc suppression. The servo motor 28 also includes a control phase winding 238 which provides rotational control. The control phase winding 238 is connected from ground buss 96 through normally closed relay contact 230 to lead 220, the center tap lead of transformer secondary 210. Arc suppression of relay contact 230 is provided by a resistor 240 and series-connected capacitor 242 while a tuning capacitor 244 is connected in parallel with control phase winding 238.

The operation of motor energization control 36, relay 232 and contacts 228 and 230, is effected by the peak detector 34 which receives input via lead 32. Thus, the input on lead 32 is applied through a gain control potentiometer 246 for input to the grid of a triode 248. The triode 248 is connected for differential operation with a pentode 250 as their respective cathodes are connected to ground buss 96 through a common resistor 252. The plate of triode 248 is connected through a balance load potentiometer 254, wiper 256 and a lead 258 to a rectified voltage source available at terminal 260. The plate of pentode 250 is similarly connected through the remaining half of the winding of balance load potentiometer 254 through wiper 256 and 258 to the voltage source 260. The voltage terminal 260 is energized by virtue of A-C input on leads 216 and 218 to primary 262 of a transformer 264. The output of a secondary winding 266 having a grounded center tap and receiving half-wave rectification by means of a rectifier 268 then places D-C potential at terminal 260. The rectified, half-wave voltage is applied through a dropping resistor 270 as filtered by grounded capacitors 272 and 274.

The plates of triode 248 and pentode 250 are also connected by respective leads 276 and 278 to opposite sides of a contact meter 280. The contact meter 280 is a commercially available item, e.g. a suitable component may be procured from Assembly Products Incorporated of Chesterland, Ohio. The contact meter 280 consists of a volt meter 282 which receives energization by plate leads 276 and 278, and which is capable of mechanically actuating a normally-open switch contact 284 to its closed position upon registration of more than a predetermined voltage. The operating range or scale of meter 282 is set by means of potentiometer 286 connected to provide a variable resistance shunt between plate leads 276 and 278. Upon registering greater than the predetermined voltage at meter 282, the meter contacts 284 will close to apply a motor control signal from the plate of triode 248 through a resistor 288 and, finally, through a normally-closed push button switch 290 to a gain control potentiometer 292. Potentiometer 292 sets the input level to the grid of a thyratron 294, e.g. a type 2D21 gas-filled electron tube. A capacitor 296 is connected across the meter contacts 284 to provide arc suppression and the normally-closed push button switch 290 is included for calibration purposes as when it may be desirable to set base line zero when there is a possibility of disabling servo motor 28.

The thyratron 294 is connected with the cathode tied directly to ground and the plate connected through relay coil 232 of motor energization control 36 for eventual connection via lead 298 to a half-wave rectified voltage source at terminal 300. The terminal 300 is energized from the opposite side of the grounded center-tapped secondary winding 266 as it operates through a rectifier 302 and dropping resistor 304. The screen grid of thyratron 294 is energized by means of a voltage divider consisting of series-connected resistors 306 and 308 connected between voltage terminal 300 and ground, and decoupling is provided by capacitor 310 to ground. A secondary winding 312 of transformer 264 provides an independent and isolated bias source for controlling the grid input level to thyratron 294. The secondary winding 312 is connected between ground and rectifier 314 to provide a rectified half-wave voltage through dropping resistor 316 and filter capacitors 318 and 320 to a bias adjustment potentiometer 322. The output wiper 324 of potentiometer 322 is then connected directly to the less positive side of the thyratron gain control potentiometer 292, such circuitry enabling precise and reliable setting of the ionization point of thyratron 294.

OPERATION

While the sensor control device 10 of the present invention is susceptible of use with various forms of sensor input device, it is primarily described with reference to gas chromatograph detectors and, more particularly, detectors of the thermal conductivity type. Thus, it is desirable to employ the sensor control device 10 in such an instance where the output indication in the form of an electrical signal is a reference or base line value with intermittent, sharply defined peak values which convey meaningful information as to the composition and proportional make-up of a gas. The sensor control device 10 is employed to maintain the reference or base line indication free of drift at a reliably constant value while still allowing the periodic, meaningful chromatographic indications to come through.

Thus, in the case where a thermal conductivity bridge 40 (FIG. 2) is employed, the bridge is first set up in balanced condition by adjustment of potentiometer 52 with control potentiometer 60 set at a suitable mid-point. Attenuator 65 is manipulated to bring the output voltage value on leads 76 and 78 to an optimum value for input to the D-C amplifier 18.

As shown in FIG. 3, the output from the D-C amplifier 18 is applied through a low pass filter 86 to limit the input to the actual variations in thermal conductivity, free from extraneous interference. Thereafter, an error signal is chopped in signal chopper 102 to provide what is effectively an A-C input on lead 114 to triode 116. This A-C error voltage is amplified in triodes 116 and 142 for input to pentode 152 and still further amplification. The output from the plate of pentode 152 is then available on each of leads 24 and 32 for error input to the motor control 26 and the peak detector 34, respectively.

Error input on lead 24 to motor control 26 is adjusted for optimum gain at potentiometer 170 whereupon it is amplified through triode 174 and triode 184 for application via lead 194 to the common connected grids of phase detector pentodes 198 and 200. The phase detector pentodes 198 and 200 have their cathodes connected through a balancing potentiometer 202 and they are biased to cut-off with no error signal input. As long as pentodes 198 and 200 are maintained at cut-off there is no current flow through alternate sides of secondary winding 210, lead 220, relay contact 230 and the control phase winding 238 of servo motor 28 to ground. This condition results in the null condition with control phase winding 238 in proper phase such that servo motor 28 effects no rotational output.

In the event of a degree of base line drift, the previously balanced and nulled output signal on control potentiometer wiper 62 will exhibit some value representing the error or amount of base line drift. This voltage is applied via leads 76 and 78 to servo amplifier 22 whereupon chopper 102 changes it to a modulated 60 cycle error signal for further amplification in triode 116, triode 142 and pentode 152 with eventual input via lead 194 to the grids of phase detector 196. An error input signal will cause conduction in pentodes 198 and 200 to pull phase-displaced current flow through control phase winding 238. The control phase winding 238 then actuates servo motor 28 to rotate control potentiometer wiper 62 a sufficient amount to once again bring about the null condition of control potentiometer 60, servo motor 28 being connected via linkage 30 to directly drive or rotate the control wiper 62. When this null condition is reached the reduced error voltage feedback through the servo amplifier 22 will tend to restore balance to the phase detector 196 of motor control 26 to maintain the system in its quiescent state; that is, a base line indication as between leads 76 and 78 at the output of thermal conductivity bridge 40 will be restored to the original base line value.

In the event that a valid chromatographic event comes through the circuitry, the servo motor 28 is deenergized by means of control relay 232 for a period of time long enough for the peak indication to be conducted out from thermal conductivity bridge 40 to the recorder or other attendant equipment. Thus, valid peak information shows up as a high amplitude A-C signal on input lead 32 to peak detector 34. This input is applied to triode 248 connected for differential amplification with pentode 250 as adjusted by balancing potentiometer 254, and contact meter 280 is actuated at a predetermined threshold to close meter contacts 284 such that thyratron 294 is fired to energize control relay 232 and open the energization circuit to servo motor 28. Thus, relay contacts 28 and 230 open the energization to both the energization winding 224 and the control phase winding 238 of servo motor 28 to disable servo motor 28 until after the peak indication has had time for registration.

The foregoing discloses a novel sensor control device which is analog in form and provides accurate control with relatively simple circuit applications. The device finds particularly valuable usage with gas chromatograph equipment as it enables continuous testing with reliably constant reference or base line indication while still allowing peak indications without interference. Further, the device enables quicker and more accurate integration of chromatographic data using only analog equipment and the more simple forms of integrating apparatus.

Changes may be made in the combination of arrangements of elements as heretofore set forth in the specification and shown in the drawings; it being understood that changes may be made in the embodiments disclosed without departing from the spirit and scope of the invention as defined in the following claims.

What is claimed is:

1. Sensor control device responsive to sensed indication in the form of an electrical sensor input signal having a predetermined reference value and periodic peak values, comprising:

bridge means including sensor means in parallel with a variable resistance means which generates said sensor input signal;

amplifier means receiving said sensor input signal and generating an output;

motor means which is mechanically connected to control said variable resistance means;

relay means which is normally-closed to energize said motor means;

servo amplifier means receiving said output from said amplifier means to generate first and second outputs, said first output connected to said motor means to control rotation of said energized motor means to maintain said sensor input signal at said reference valve; and said second output connected to the input of reactance means for detecting peaks of said sensor input signal to actuate said relay means open to de-energize said motor means.

2. A sensor control device as set forth in claim 1 wherein said amplifier means comprises:

input means including low pass filter means and receiving said sensor input signal;

chopper means connected to said input means to produce an A-C signal which is amplitude modulated in accordance with said sensor input signal; and reactance means for receiving and amplifying said A-C signal to generate said first and second outputs.

3. A sensor control device as set forth in claim 1 wherein said servo amplifier means comprises:

phase detector means receiving said first output at its respective input and providing said control output to said motor means.

4. A sensor control device as set forth in claim 1 wherein said motor means comprises:

an A-C motor having a first energizing winding which is connected to said normally closed relay means; and having a second control phase winding which is connected to receive said control output from said servo amplifier means.

5. A sensor control device as set forth in claim 4 wherein said servo amplifier means comprises:

phase detector means receiving said first output at its respective input and providing said control output to said motor means.

6. A sensor control device as set forth in claim 5 wherein said amplifier means comprises:

input means including low pass filter means and receiving said sensor input signal;

chopper means connected to said input means to produce an A-C signal which is amplitude modulated in accordance with said sensor input signal; and reactance means for receiving and amplifying said A-C signal to generate said first and second outputs.

7. A sensor control device as set forth in claim 5 wherein said phase detector means comprises:

first and second electron tubes each receiving said first output at its control grid, each having the cathode equally biased, and each having a plate energizing circuit;

transformer means having an A-C energized primary winding and a center-tapped secondary winding which is connected at opposite sides to said respective plate energizing circuits with the center tap connected to energize said motor control phase winding.

8. A sensor control device as set forth in claim 1 wherein said bridge means comprises:

a first bridge terminal;

first and second thermistors having one end connected to said first bridge terminal;

a second bridge terminal;

a pair of resistance means connected between the remaining ends of each of said first and second thermistors and said second bridge terminal;

a power source connected to supply D-C voltage across said first and second bridge terminals; and output means tapping off said sensor input signal from one of said resistance means.

9. A sensor control device as set forth in claim 7 wherein said bridge means comprises:

a first bridge terminal;

first and second thermistors having one end connected to said first bridge terminal;

a second bridge terminal;

a pair of resistance means connected between the remaining ends of each of said first and second thermistors and said second bridge terminal;

a power source connected to supply D-C voltage across said first and second bridge terminals; and output means tapping off said sensor input signal from one of said resistance means.

10. A sensor control device as set forth in claim 1 wherein said reactance means comprises:

difference amplifier means receiving said second output and generating a signal output indicative of valid peak signals;

normally-open switch means which conducts said peak signal output when closed;

contact meter means which is controlled by said peak signal output to close said normally-open switch means when the peak signal exceeds a predetermined value; and thyratron means connected to energize said relay means to the open position upon conduction, said thyratron receiving said peak signal output upon closure of said normally-open switch means by said contact meter means.

11. A sensor control device as set forth in claim 5 wherein said reactance means comprises:

difference amplifier means receiving said second output and generating a signal output indicative of valid peak signals;

normally-open switch means which conducts said peak signal output when closed;

contact meter means which is controlled by said peak signal output to close said normally-open switch means when the peak signal exceeds a predetermined value; and thyratron means connected to energize said relay means to the open position upon conduction; said thyratron receiving said peak signal output upon closure of said normally-open switch means by said contact meter means.

References Cited
UNITED STATES PATENTS

| | | | | |
|---|---|---|---|---|
| 3,396,336 | 8/1968 | Cropper | 324—103 |
| 3,405,358 | 10/1968 | Cropper | 324—103 |
| 3,460,035 | 8/1969 | Louvel | 324—103 |
| 3,359,410 | 12/1967 | Frisby et al. | 73—19 |
| 2,951,211 | 8/1960 | Brashear | 324—99 X |
| 3,183,438 | 5/1965 | Hirsch | 324—99 X |
| 3,381,519 | 5/1968 | Ashmead et al. | 73—23.1 |

RICHARD C. QUEISSER, Primary Examiner

E. J. KOCH, Assistant Examiner

U.S. Cl. X.R.

324—99; 73—23.1